(12) United States Patent
Leimbach (10) Patent No.: US 6,321,141 B1
(45) Date of Patent: Nov. 20, 2001

(54) METHOD AND DEVICE FOR DETECTING MOTOR VEHICLE TILT

(75) Inventor: Klaus-Dieter Leimbach, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,199

(22) PCT Filed: Jun. 30, 1998

(86) PCT No.: PCT/DE98/01793

§ 371 Date: Sep. 24, 1999

§ 102(e) Date: Sep. 24, 1999

(87) PCT Pub. No.: WO99/26810

PCT Pub. Date: Jun. 3, 1999

(30) Foreign Application Priority Data

Nov. 22, 1997 (DE) .............................. 197 51 839

(51) Int. Cl.[7] .............................. G05D 1/00; G05D 3/00; G06F 7/00; G06F 17/00; G06F 19/00
(52) U.S. Cl. .............................. 701/1; 701/36; 701/45; 701/70-93; 180/282-284; 318/586; 340/425.5; 434/61; 172/2; 172/4.5
(58) Field of Search .............................. 701/1, 36, 45, 701/70-93; 180/282, 283, 284; 303/9.69; 318/586; 340/425.5; 434/61; 172/4.5, 2

(56) References Cited

U.S. PATENT DOCUMENTS

| 3,609,313 | 9/1971 | Lucien .............................. 235/150.24 |
|---|---|---|
| 4,023,864 | 5/1977 | Lang et al. .............................. 303/20 |
| 4,386,674 | 6/1983 | Sugata .............................. 180/142 |
| 4,569,239 | * 2/1986 | Shirley et al. .............................. 74/89.15 |
| 4,964,679 | 10/1990 | Rath .............................. 303/100 |
| 5,446,658 | 8/1995 | Pastor et al. .............................. 364/424.01 |
| 5,471,386 | 11/1995 | Davorin et al. .............................. 364/426.02 |
| 5,869,943 | * 2/1999 | Nakashima et al. .............................. 318/586 |
| 5,890,084 | * 3/1999 | Halasz et al. .............................. 701/45 |
| 6,002,975 | * 12/1999 | Schiffmann et al. .............................. 701/36 |
| 6,038,495 | * 3/2000 | Schiffmann .............................. 701/1 |

(List continued on next page.)

FOREIGN PATENT DOCUMENTS

| 32 22 149 | 11/1983 | (DE) . |
|---|---|---|
| 42 28 893 | 3/1994 | (DE) . |
| 43 42 732 | 6/1995 | (DE) . |
| 44 16 991 | 11/1995 | (DE) . |
| 196 32 943 | 2/1998 | (DE) . |
| 0 330 149 | 8/1989 | (EP) . |
| 2 425 342 | 12/1979 | (FR) . |
| 2 257 403 | 1/1993 | (GB) . |
| 01 101238 | 4/1989 | (JP) . |
| WO 97 28017 | 8/1997 | (WO) . |

OTHER PUBLICATIONS

Zanten et al., *Fdr–Die Fahrdynamik–Regelung von Bosch*, Atz Automobil Technische Zeitschrift., vol. 96, No. 11, pp. 674–689 (Nov. 1994). Cited in specification.

Limpert Leiber, *Der Elektronische Bremsregler*, Atz Automobiltechnische Zeitschrift., vol. 71, No. 6, pp. 181–189 (Jun. 1969).

Primary Examiner—William A. Cuchlinski, Jr.
Assistant Examiner—Ronnie Mancho
(74) Attorney, Agent, or Firm—Kenyon & Kenyon (57) ABSTRACT

A method and a device are provided for detecting a tendency of a vehicle to tip about a vehicle axis oriented in the longitudinal direction of the vehicle. To this end, a variable is ascertained describing the dynamics of the vehicle linear motion. The detection strategy used for detecting the tendency of the vehicle to tip is selected from at least two detection strategies at least as a function of the variable describing the dynamics of the vehicle linear motion and/or the detection strategy used for detecting a tendency of the vehicle to tip is adapted, at least as a function of the variable describing the dynamics of the vehicle linear motion, to the dynamics of the vehicle linear motion existing at any one time.

21 Claims, 5 Drawing Sheets

U.S. PATENT DOCUMENTS

| | | | | |
|---|---|---|---|---|
| 6,073,065 | * | 6/2000 | Brown et al. | 701/36 |
| 6,081,761 | * | 6/2000 | Harada et al. | 701/72 |
| 6,104,284 | * | 8/2000 | Otsuka | 340/440 |
| 6,113,138 | * | 9/2000 | Herman et al. | 280/735 |
| 6,115,659 | * | 9/2000 | Buchheim et al. | 701/45 |
| 6,128,076 | * | 10/2000 | Sackett | 356/249 |
| 6,141,604 | * | 10/2000 | Mattes et al. | 701/1 |
| 6,157,295 | * | 12/2000 | Steiner et al. | 340/440 |

\* cited by examiner

METHOD AND DEVICE FOR DETECTING MOTOR VEHICLE TILT

FIELD OF THE INVENTION

The present invention relates to a method and a device for detecting a tendency of a vehicle to tip.

BACKGROUND INFORMATION

Methods and devices for detecting a tendency of a vehicle to tip are known in a great variety of modifications from the related art.

German Patent No. 44 16 991 describes a method and a device for warning the driver of a truck about the danger of tipping when cornering. To do so, the vehicle type and the status data relevant for the risk of tipping are determined before the vehicle enters the curve, and the tipping risk or the critical velocity crucial for the latter is ascertained as a function of the vehicle center of gravity and the curve radius. A signal prompting the driver to reduce his speed is triggered when the prevailing traveling speed of the vehicle establishes the risk of tipping, or a predefined safety margin from the risk of tipping is no longer met. The vehicle traveling speed at which there is with certainty no danger of tipping is ascertained on the basis of a tipping equation. The tipping equation includes, inter-alia, the traveling speed, the curve radius traveled by the vehicle, the height of the vehicle center of gravity over the roadway, as well as the imbalance of the wheel loads. The wheel loads are ascertained with the aid of wheel-load sensors embedded in the roadway. If the vehicle traveling speed falls short of a predefined safety margin relative to the traveling speed at the limit of the danger of tipping, then a signal is generated warning the vehicle driver about the excessive speed when navigating the curve. The signal indicating the excessive traveling speed is triggered until the respective measured traveling speed is reduced to an extent ruling out any danger of tipping. German Patent No. 44 16 991 also describes that the slippage of the wheels of the respective vehicle on the roadway can be ascertained and taken into consideration when assessing the danger of tipping.

An object of the present invention is to improve the method for detecting a tendency of a vehicle to tip.

SUMMARY OF THE INVENTION

A tendency of a vehicle to tip about a vehicle axis oriented in the longitudinal direction of the vehicle is detected using a method according to the present invention. To do so, a variable is ascertained describing the dynamics of the vehicle linear motion. The detection strategy used for detecting a tendency of the vehicle to tip about a vehicle axis oriented in the longitudinal direction of the vehicle is selected from at least two detection strategies, at least as a function of the variable describing the dynamics of the vehicle linear motion, and/or the detection strategy used for detecting a tendency of the vehicle to tip about a vehicle axis oriented in the longitudinal direction of the vehicle is adapted, at least as a function of the variable describing the dynamics of the vehicle linear motion, to the respective existing dynamics of the vehicle linear motion.

At this point, it should be noted that when hereinafter the term "tendency of the vehicle to tip" is used, it is intended to mean the "tendency of the vehicle to tip about a vehicle axis oriented in the longitudinal direction of the vehicle." The wording "a vehicle axis oriented in the longitudinal direction of the vehicle" should be understood as follows: First of all, the vehicle axis about which the vehicle has a tendency to tip can be the actual longitudinal vehicle axis. Secondly, it can be a vehicle axis which is rotated by a certain angle with respect to the actual longitudinal vehicle axis. In this case, it is unimportant whether or not the rotated vehicle axis passes through the center of gravity of the vehicle. The case of the rotated vehicle axis should also permit an orientation of the vehicle axis at which the vehicle axis corresponds either to a diagonal axis of the vehicle or to an axis parallel to this.

The selection of the detection strategy as a function of a variable describing the dynamics of the vehicle linear motion and/or the adaptation of the detection strategy, as a function of a variable describing the dynamics of the vehicle linear motion, to the respective existing dynamics of the vehicle linear motion, substantiates the advantage compared to the related art, that the detection of the tendency of the vehicle to tip is always optimally adapted to the vehicle situation.

A method for detecting a tendency of the vehicle to tip may be advantageously utilized within the framework of a method for stabilizing the vehicle. Such a method for stabilization can advantageously be a method for preventing the vehicle from overturning.

In response to the existence of a tendency of the vehicle to tip, at least braking interventions at at least one wheel and/or engine interventions and/or interventions in the chassis actuators are advantageously carried out to stabilize the vehicle, in particular, to prevent the vehicle from overturning.

For at least one wheel, a variable describing the rotary motion of the representative wheel, in particular, a variable describing the wheel speed, is advantageously ascertained. The variable describing the dynamics of the vehicle linear motion, which corresponds, in particular to the drive slip and/or brake slip ascertained for at least one wheel and prevailing at this wheel, is advantageously ascertained at least as a function of the variable, ascertained for at least one wheel, which describes the rotary motion of the representative wheel. A further advantage is that a tendency of the vehicle to tip is detected at least as a function of the variable, ascertained for at least one wheel, which describes the rotary motion of the representative wheel.

The absolute value of the variable which describes the dynamics of the vehicle linear motion is advantageously compared to at least one corresponding threshold value. The detection strategy utilized is selected and/or adapted as a function of this comparison.

A variable describing the wheel properties is ascertained for at least one wheel, in particular, a variable describing the diameter or the radius of the respective wheel. Advantageously, at least one of the at least two detection strategies is carried out at least as a function of the variable, ascertained for at least one wheel, which describes the wheel properties of the respective wheel. It has proven to be advantageous if the variable describing the properties of the wheel is ascertained at least as a function of a variable describing the wheel speed of the representative wheel, a variable describing the vehicle speed, a variable describing the dynamics of the vehicle lateral motion, and a variable describing the geometry of the vehicle.

The absolute value of the variable which describes the dynamics of the vehicle linear motion is compared to at least one corresponding threshold value. Advantageously, a first of the at least two detection strategies is carried out when the absolute value of the variable is less than the at least one corresponding threshold value. In this case, the first detection strategy is carried out at least as a function of the variable, ascertained in the prevailing time increment for the at least one wheel, which describes the wheel properties. Advantageously, a second of the at least two detection strategies is carried out when the absolute value of the variable is greater than the at least one corresponding threshold value. In this case, the second detection strategy is carried out at least as a function of the variable, ascertained in a previous time increment for the at least one wheel, which describes the wheel properties.

According to a first of the at least two detection strategies, various queries are carried out. Advantageously, a tendency for the vehicle to tip about a vehicle axis oriented in the longitudinal direction of the vehicle exists:

When for at least one wheel, the value of the variable which quantitatively describes the wheel properties is greater than a first threshold value. Or when for at least one wheel, the value of the variable which quantitatively describes the wheel properties is less than a second threshold value.

When for at least one wheel, the amount of a difference which is formed from the value of the variable that quantitatively describes the wheel properties, and from a comparison value, is greater then a corresponding threshold value.

When for at least one wheel, the absolute value of a variable which describes the characteristic over time of the variable quantitatively describing the wheel properties is less than a corresponding threshold value.

When the absolute value of a variable describing the angle of inclination of a wheel axle is greater than a corresponding threshold value. In this case, the variable describing the angle of inclination of a wheel axle is advantageously ascertained as a function of the variables, ascertained in each case for the wheels of the representative wheel axle, which quantitatively describe the wheel properties.

According to a second of the at least two detection strategies, the vehicle has a tendency to tip when the amount of a difference, formed from a variable describing the vehicle speed and a speed limiting value, is less than a corresponding threshold value. The speed limiting value is advantageously ascertained at least as a function of a variable describing the height of the vehicle center of gravity, this being determined at least as a function of the variable, ascertained for at least one wheel, which quantitatively describes the wheel properties.

It has proven to be advantageous when the detection of whether a vehicle has a tendency to tip is carried out when the absolute value of a variable describing the dynamics of the vehicle lateral motion, in particular, the absolute value of a variable describing the transverse acceleration and/or of a variable describing the yaw rate of the vehicle, is greater than a corresponding threshold value. In this way, the method according to the present invention is only activated in such lateral-dynamic vehicle situations in which the vehicle can be expected to have a tendency to tip.

Input variables, in particular the variables describing the wheel properties, are useful in carrying out the detection strategy utilized. The detection strategy utilized is implemented with the aid of plausibility queries. The detection strategy utilized is advantageously adapted to the dynamics of the vehicle linear motion existing at any one time, in that different input variables are selectable as input variables as a function of the existing dynamics of the vehicle linear motion, and/or that the plausibility queries performed in the detection strategy utilized can be changed as a function of the existing dynamics of the vehicle linear motion.

BRIEF DESCRIPTION OF THE DRAWINGS

FIG. 3b shows a second part of the flowchart of FIG. 3a.

DETAILED DESCRIPTION

Figure 1A:
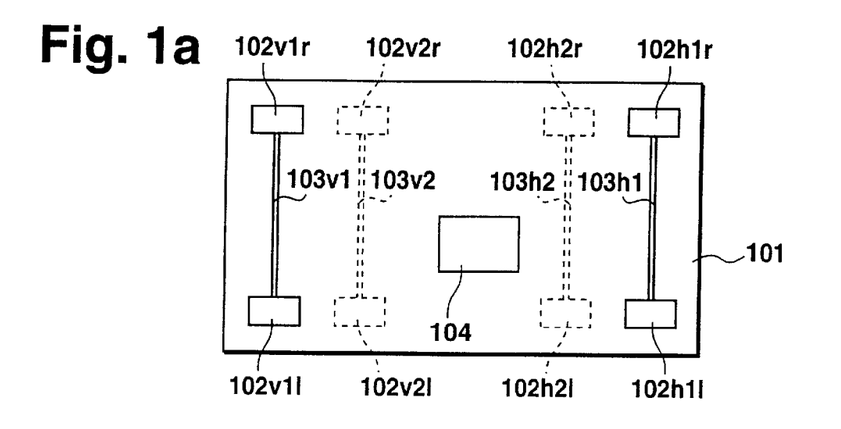
FIG. 1a shows a one-piece vehicle for which a method according to the present invention may be used.
Figure 1B:
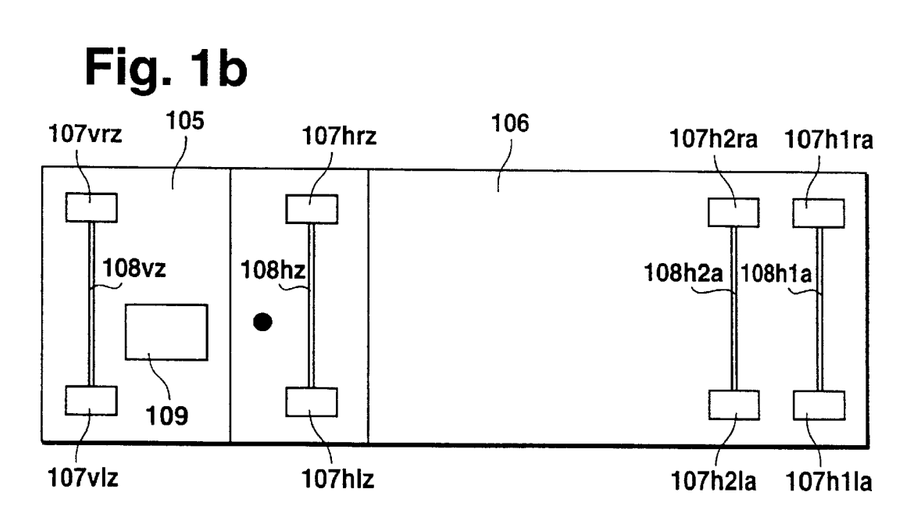
FIG. 1b shows a vehicle combination for which a method according to the present invention may be used.

FIGS. 1a and 1b, which show various road vehicles for which the method of the present invention can be used, shall be discussed first.

FIG. 1a shows a one-piece vehicle 101. This vehicle can be a passenger car or a commercial vehicle. One-piece vehicle 101 shown in FIG. 1a should be a vehicle with at least two wheel axles, which are indicated by the dotted lines in part of the representation. The wheel axles of vehicle 101 are designated as 103ix. Index i indicates whether it is a front axle (v) or a rear axle (h). For vehicles with more than two axles, index x indicates which of the front or rear axles it is. The following allocation is applicable: Index x having the smallest value is allocated in each case to the front and/or rear axle closest to the boundary of the vehicle. The farther the respective wheel axle from the vehicle boundary, the greater the value of the associated index x. Wheels 102ixj are assigned to wheel axles 103ix. The meaning of indices i and x corresponds to that described above. Index j indicates whether the wheel is on the right (r) or left (l) side of the vehicle. In the representation of wheels 102ixj, no distinction has been made between single wheels and twin wheels. Furthermore, vehicle 101 has a control unit 104 in which the device according to the present invention for carrying out the method of the present invention is implemented.

To elucidate the representation selected in FIG. 1a, it should be explained by way of an example: A two-axle vehicle has a front axle 103v1 with wheels 102v1r and 102v1l assigned to it, as well as a rear axle 103h1 with wheels 102h1r and 102h1l assigned to it. A triple-axle vehicle will normally have a front axle 103v1 with wheels 102v1r and 102v1l, respectively, and a first rear axle 103h1 with wheels 102h1r and 102h1l, as well as a second rear axle 103h2 with wheels 102h2r and 102h2l, respectively.

FIG. 1b shows a vehicle combination composed of a towing vehicle 105 and a semi-trailer 106. The depiction selected is not intended to represent any restriction; a vehicle combination composed of, for example a towing vehicle and a drawbar trailer is also contemplated by the present invention. Towing vehicle 105 should have wheel axles 108iz. Corresponding wheels 107ijz are allocated to wheel axles 108iz. The meaning of indices i and j corresponds to that already described in connection with FIG. 1a. Index z indicates that these are wheels or wheel axles of the towing vehicle. Furthermore, towing vehicle 105 has a control unit 109 with which a tendency of towing vehicle 105 and/or of semi-trailer 106 and/or of the entire vehicle combination to tip about a vehicle axis oriented in the longitudinal direction of the vehicle is detected. Semi-trailer 106 should have two wheel axles 108ixa. Wheels 107ixja are assigned correspondingly to the two wheel axles 108ixa. The meaning of indices i and x and j corresponds to that already described in connection with FIG. 1a. Index a indicates that these are components of semi-trailer 106. The number of wheel axles for towing vehicle 105 or for semi-trailer 106 shown in FIG. 1b is not intended to represent any restriction. Control unit 109 may also be arranged in semi-trailer 106 instead of in towing vehicle 105. It is also conceivable to equip both towing vehicle 105 and semi-trailer 106 with a separate control unit.

The characterization of indices a, i, j, x and z selected in FIGS. 1a and 1b is corresponding for all the variables and components for which they are used.

Figure 2:
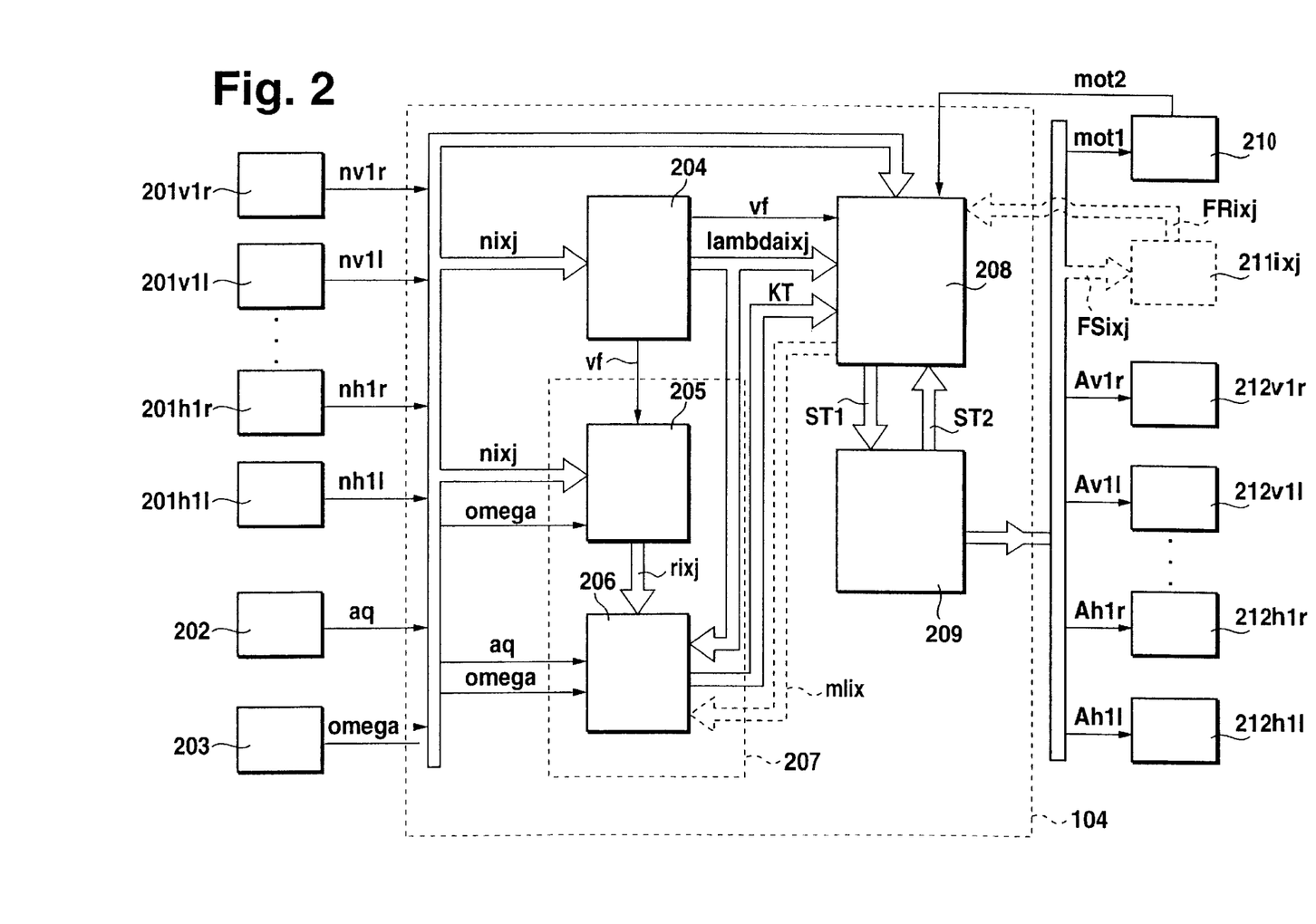
FIG. 2 shows a survey arrangement of a device according to the present invention.

A device according to the present shall be described with the aid of FIG. 2. The vehicle taken as a basis is a one-piece vehicle as shown in FIG. 1a. This is not intended to represent any restriction; the method of the present invention can be used correspondingly for a vehicle combination as well. It is assumed that the one-piece vehicle has at least two wheel axles 103ix. These two wheel axles are front axle 103vl with wheels 102v1r and 102v1l, as well as rear axle 103h1 with wheels 102h1r and 102h1l. Wheel-speed sensors 201v1r, 201v1l, 201h1r and 201h1l assigned to these wheels, with which a variable describing the rotary motion of the corresponding wheel, particularly a variable describing the speed of the corresponding wheel, is ascertained, are shown in FIG. 2. Depending on the number of wheel axles of the one-piece vehicle, additional wheel-speed sensors 201ixj may also be taken into account, as indicated in FIG. 2. Variables nixj describing in each case the speed of corresponding wheel 102ixj are determined with wheel-speed sensors 201ixj. Variables nixj are supplied to blocks 204, 205 and 208.

It is further assumed that vehicle 101 has a transverse-acceleration sensor 202 and a yaw-rate sensor 203. It should be pointed out here that the use of transverse-acceleration sensor 202 and yaw-rate sensor 203, respectively, is not intended to represent any restriction. For example, instead of determining a variable aq describing the transverse acceleration with the aid of a transverse-acceleration sensor, this variable may also be ascertained on the basis of variables nixj. Likewise, instead of determining a variable omega describing the yaw rate of the vehicle with the aid of a yaw-rate sensor 203, this variable may also be ascertained on the basis of variables nixj.

Variable aq describing the transverse acceleration of the vehicle, ascertained with the aid of transverse-acceleration sensor 202, is fed both to block 208 and to a block 206. Variable omega describing the yaw rate of the vehicle, ascertained with the aid of yaw-rate sensor 203, is fed to blocks 208, 205 and 206.

In block 204, a variable vf describing the vehicle speed is ascertained in a conventional manner from variables nixj. The variable vf is supplied from block 204 to blocks 205 and 208, respectively. Furthermore, variables lambdaixj, representing the variables describing the dynamics of the vehicle linear motion, which describe the drive slip and/or brake slip of the wheels, are ascertained in block 204 in a conventional manner based on variables nixj and variable vf. The variables lambdaixj are supplied from block 204 to both block 206 and block 208.

Variables rixj, which quantitatively describe the properties of the wheels, are ascertained in block 205 on the basis of variable vf, variables nixj and variable omega. The variables rixj are a function of the wheel load acting on the respective wheel. In particular, variables rixj describe the dynamic rolling radii of the wheels, which are determined using the equation:

$$rixj = \frac{vf \pm a \cdot omega}{nixj}$$

variable a in the equation describing half the tread of the vehicle. The plus sign is used for the wheels on the outside of the curve and the minus sign for the wheels on the inside of the curve.

It should be pointed out here that variable omega, used in the above equation, describing the yaw rate of the vehicle can also be replaced by a term derived from the transverse acceleration of the vehicle and the vehicle speed. In this case, instead of variable omega, variable aq would be supplied to block 205.

Variables rixj quantitatively describing the wheel properties, which correspond to the dynamic rolling radii of the wheels, are supplied from block 205 to block 206. Since variables rixj quantitatively describing the wheel properties are the dynamic rolling radii, these variables describe the diameter, or correspondingly, the radius of the respective wheel.

In block 206, on the basis of variables lambdaixj, rixj, aq and omega, as well as variables mlix alternatively supplied to it, it is determined whether the vehicle has a tendency to tip about a vehicle axis oriented in the longitudinal direction of the vehicle. To that end, at least two different detection strategies are implemented in block 206, which will be discussed in detail in connection with FIG. 3.

To detect whether the vehicle has a tendency to tip, various queries, which are combined to form several detection strategies, are carried out in block 206 on the basis of variables supplied to it. If it is determined in block 206 that the vehicle does have a tendency to tip about a vehicle axis oriented in the longitudinal direction of the vehicle, a variable KT is generated and supplied from block 206 to block 208. Using this variable KT, the controller, that is to say the vehicle controller 208, is informed whether or not the vehicle has a tendency to tip. In FIG. 2, the two components 205 and 206, respectively, which are contained in the control unit, are combined to form one block 207.

The controller or vehicle controller 208 which is implemented in control unit 104 is designated as 208. Controller 208 is, for example, a controller which, in its basic function, regulates a variable describing the operating dynamics of the vehicle, e.g., a variable which is a function of the transverse acceleration and/or yaw rate of the vehicle, and does so by interventions in the wheel brakes and/or the engine. Such a controller is described, for example, in the article "*FDR— die Fahrdynamikregelung von Bosch*" published in the automotive engineering journal Automobiltechnische Zeitschrift (ATZ), vol. 16, no 11 (1994) pages 674 through 689. The control taking place in block 208 in its basic function is based in a conventional manner on variables supplied to block 208, namely nixj, aq, omega, vf, lambdaixj, a variable mot2 describing, for example, the engine speed of engine 210 and supplied from engine 210 to block 208, as well as variables ST2, supplied to block 208 from a block 209 which represents the control logic for the actuators present in the vehicle. It should be pointed out here that the control described above for the basic function of the controller is not intended to represent any restriction. As an alternative to this control, a brake-slip control which intervenes in the wheel brakes and/or a drive-slip control which intervenes in the wheel brakes and/or the engine, can also be implemented in controller 208 as its basic function.

In addition to the control implemented in block 208 in the basic function, an overturn prevention is implemented in controller 208. The overturn prevention is carried out on the basis of, for example, variables KT, which are generated in block 206 within the framework of the overturn detection. With variables KT, controller 208 can be informed, first of all, that the vehicle has a tendency to tip about a vehicle axis oriented in the longitudinal direction of the vehicle; in addition, controller 208 can be informed how strong this tendency is to tip. Furthermore, variables KT may contain information regarding how the vehicle is at risk of tipping and to which wheels this risk applies.

Axle-specific wheel loads mlix are used in block 206 for one of the detection strategies carried out therein. They are ascertained in controller 208 in a conventional manner, for example, from the wheel speeds, and are supplied to block 206.

Controller 208 generates variables ST1 which are supplied to control logic 209, by which the actuators allocated to the vehicle are driven. Variables ST1 communicate to control logic 209 which actuators are to be driven. In this context, variables ST1 are ascertained both for the control of the basic function and for the overturn prevention. With respect to the generation of variables ST1 in accordance with the control implemented for the basic function, reference is made to the publication "FDR—die Fahrdynamikregelung von Bosch" specified above. If the vehicle has a tendency to tip, then variables ST1 are modified accordingly.

To prevent the vehicle from rolling over about a vehicle axis oriented in the longitudinal direction of the vehicle, illustratively, the following interventions in the actuators of the vehicle are contemplated by the present invention: First of all, the vehicle speed can be reduced by braking or by taking back the engine torque. Secondly, roll-over of the vehicle can be counteracted in a controlled manner by wheel-individual braking interventions. Furthermore, a rolling motion of the vehicle can be limited by interventions in the chassis actuators assigned to the vehicle.

In block 209, the control logic, variables ST1 generated by controller 208 are converted into driving signals for engine 210 and driving signals for the actuators of the vehicle. The actuators are, for example, chassis actuators 211ixj by which the performance characteristics of the chassis can be influenced, and actuators 212ixj by which a braking force can be generated at the corresponding wheels. To drive engine 210, the control logic generates a signal mot1 by which, for example, the throttle valve setting of the engine can be influenced. To drive chassis actuators 211ixj, control logic 209 generates signals Fsixj by which the attenuation or rigidity implemented by chassis actuators 211ixj can be influenced. To drive actuators 212ixj, which are designed in particular as brakes, control logic 209 generates signals Aixj by which the braking forces generated by actuators 212ixj at the corresponding wheels can be influenced. Control logic 209 generates variables ST2 which are supplied to controller 208 and contain information about the driving of the individual actuators.

The chassis of the vehicle is influenced by chassis actuators 211ixj. In order for the controller to detect the actual status of chassis actuators 211ixj, signals Frixj are supplied from chassis actuators 211ixj to controller 208.

It should be pointed out here that it is also contemplated by the present invention to use "retarders" in addition to the actuators shown in FIG. 2.

The braking system used in FIG. 2 may be a hydraulic or pneumatic or electrohydraulic or electropneumatic braking system.

Figure 3A:
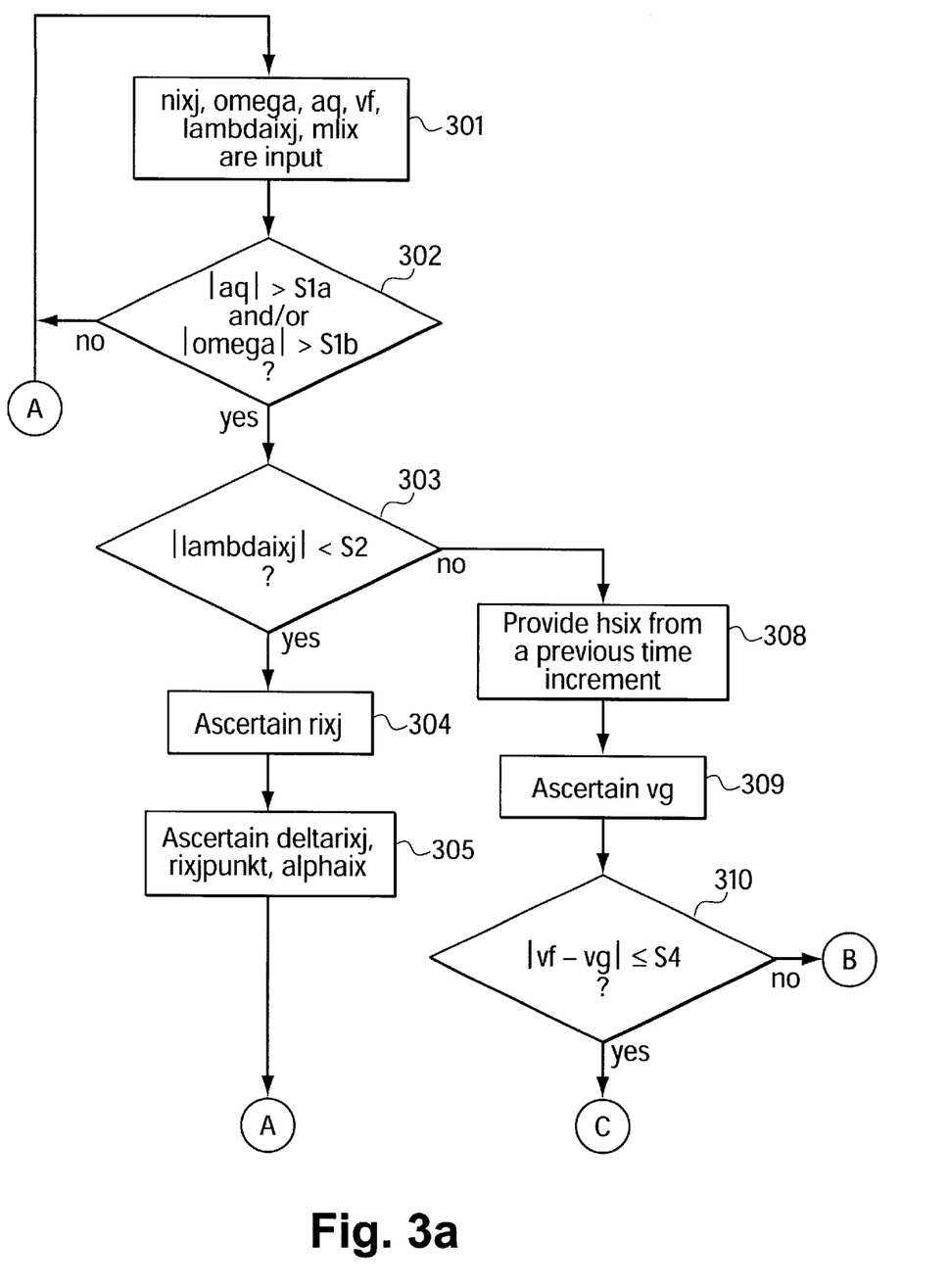
FIG. 3a shows a first part of a flowchart illustrating a method according to the present invention.
Figure 3B:
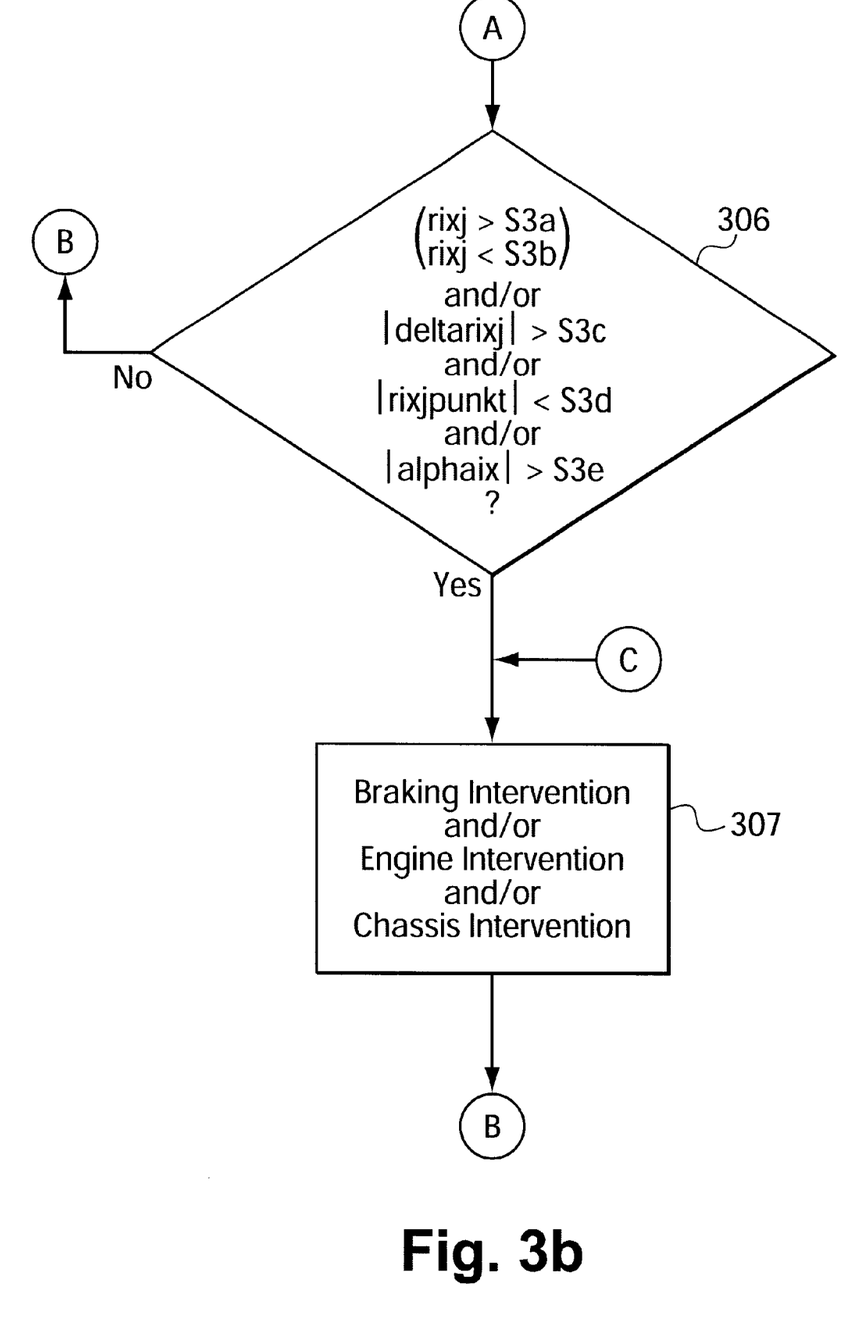

The sequence of the method according to the present invention shall be illustrated with the aid of the flow chart shown in FIGS. 3a and 3b. The flow chart shown in FIG. 3 describes the sequence of the method according to the present invention, as it would proceed for a one-piece vehicle shown in FIG. 1a, which is based on the device according to the present invention as illustrated in FIG. 2. The method according to the present invention illustrated in FIGS. 3a and 3b may be implemented in the two blocks 205 and 206, respectively, which may be combined to form block 207.

The method according to the present invention begins with a step 301 in which variables nixj, omega, aq, vf, lambdaixj and mlix are input. A step 302 is carried out following step 301. At this point, the meaning of the phrase "and/or" used in FIGS. 3a and 3b should be explained. The "and/or" is intended to represent the "AND/OR" logic operation.

The query performed in step 302 determines whether a driving condition exists in which a tendency of the vehicle to tip about a vehicle axis oriented in the longitudinal direction of the vehicle can occur. To that end, it is determined in step 302 whether the absolute value of variable aq describing the transverse acceleration of the vehicle is greater than a first threshold value S1a and/or whether the absolute value of variable omega describing the yaw rate of the vehicle is greater than a second threshold value S1b.

The alternative linking of the two partial queries in step 302 has the following reasons: First, the case may occur that either variable aq describing the transverse acceleration or variable omega describing the yaw rate are supplied to block 206. In this case, only one of the two partial queries can be carried out. On the other hand, the case may occur where both variables are supplied to block 206. In this case, either one of the two partial queries can be carried out, or both partial queries can be carried out at the same time to make the results more reliable. If at least one of the two partial queries is satisfied in step 302, then a step 303 is carried out following step 302. If, however, neither of the two partial queries is satisfied in step 302, step 301 is carried out again following step 302.

In step 303, the absolute value of variable lambdaixj describing the drive slip and/or brake slip is compared to a threshold value S2. The query performed in step 303 is carried out for the following reason: The determination in step 304 of variables rixj, quantitatively describing the wheel properties, which represent the dynamic rolling radii of the wheels can be carried out if the wheels are more or less free of slip, i.e., if the drive slip and/or brake slip of the wheels is less than a predetermined threshold value. If this is not the case, variables rixj which quantitatively describe the wheel properties cannot be determined without error.

If it is found in step 303 that the absolute value of variable lambdaixj is less than the corresponding threshold value, then following step 303, a step 304 is carried out with which a first detection strategy is initiated including steps 304 through 306. However, if it is found in step 303 that the absolute value of variable lambdaixj is greater than the corresponding threshold value S2, then following step 303, a step 308 is carried out with which a second detection strategy is initiated including of steps 308 through 310.

In an exemplary embodiment, according to the present invention one of the two different detection strategies is selected as a function of the comparison performed in step 303. However, an exemplary embodiment is also contemplated by the present invention in which no detection strategy is selected, but in which, at least as a function of the comparison performed in step 303, i.e., at least as a function of variable lambdaixj describing the dynamics of the vehicle linear motion, the detection strategy is adapted to the dynamics of the vehicle linear motion existing at any one time. The detection strategy can be adapted, for example, by selecting the input variables, useful for implementing the detection strategy, from various input variables as a function of the existing dynamics of linear motion. Alternatively, for detection strategies including of plausibility queries, it is contemplated by the present invention to select or to alter the plausibility queries, carried out in the detection strategy, as a function of the existing dynamics of the vehicle linear motion.

It should be pointed out here that the indexed representation used in the individual steps, indicated lambdaixj here as example, is intended to denote that the individual steps are to be carried out for any desired single wheel or any desired number of wheels or for all the wheels of the vehicle.

In step 304, the variables quantitatively describing the wheel properties are ascertained with the aid of the equation given above. These variables can be ascertained only if there is not much wheel slip, i.e., these variables can be ascertained only if there is not too great a difference between the wheel speeds and the vehicle speed. If the difference between the wheel speeds and the vehicle speed is too great, as is the case, for example, when individual wheels exhibit great slippage, then faulty decisions may be made in step 306 on the basis of variables rixj determined in this vehicle state. A step 305 is carried out following step 304. In step 305, variables deltarixj, rixjpunkt and alphaix are ascertained. Variable deltarixj is a difference derived from the prevailing value, namely variable rixj quantitatively describing the wheel properties, and a value, namely the variable quantitatively describing the wheel properties, which was ascertained when driving straight ahead.

The value corresponding to the variable quantitatively describing the wheel properties when driving straight ahead is determined from time to time in suitable driving situations and is stored temporarily in a suitable memory.

Variable rixjpunkt is a variable representing the time characteristic of variable rixj which quantitatively describes the wheel properties. In particular, variable rixjpunkt corresponds to the time derivative of variable rixj. Variable a is a variable describing the angle of inclination of a wheel axle. Variable alphaix is determined according to the equation:

$$alphaix = \left| \frac{rixl - rixr}{2 \cdot a} \right|$$

As this equation shows, the variable describing the inclination of the wheel axle is determined on the basis of the variables determined for the two wheels of the wheel axle, in each case quantitatively describing the wheel properties. In addition, tread 2a of the vehicle enters into variable alphaix. The above equation for angle of inclination alphaix represents an approximation which is true for small angles alphaix.

A step 306 is carried out following step 305. With the aid of step 306, it is detected whether the vehicle has a tendency to tip about a vehicle axis oriented in the longitudinal direction of the vehicle. The individual queries performed in step 306 are carried out using the variables ascertained in step 305, which, in turn, are determined as a function of the prevailing value of variable rixj quantitatively describing the wheel properties as determined in step 304. The presentation selected in step 306 is intended to express the following: Either the method according to the present invention can be designed in such a way that in general only one of these four partial queries is implemented, or that a portion of these partial queries is implemented, or that all the partial queries are implemented.

In a first partial query, it is determined whether the prevailing value of variable rixj is greater than a first threshold value S3a. First threshold value S3a is intended to represent the radius of the unloaded wheel. With the aid of this query, it is consequently ascertained whether the dynamic rolling radius of a wheel of the vehicle is greater than that of an unloaded wheel due to the tendency of the vehicle to tip. This query determines whether, when cornering, the wheels on the inside of the curve are at risk of lifting. The first partial query includes another query with which it is ascertained whether the prevailing value of variable rixj is less than a second threshold value S3b. This query determines wheels which are on the outside of the curve and which are greatly compressed due to the tendency of the vehicle to tip. Thus, with the aid of the first partial query, the absolute magnitude of the dynamic rolling radius is compared to corresponding threshold values to detect the tendency of the vehicle to tip. The vehicle has a tendency to tip when either the dynamic rolling radius of a wheel on the inside of the curve is greater than threshold value S3a or when the dynamic rolling radius of a wheel on the outside of the curve is less than threshold S3b.

In a second partial query, it is determined whether the amount of difference deltarixj is greater than a third threshold value S3c. With this query, the relative change in the dynamic rolling radius resulting when cornering after driving straight ahead is evaluated to detect whether the vehicle has a tendency to tip. The vehicle has a tendency to tip when the amount of the difference is greater than corresponding threshold value S3c.

In a third partial query, it is determined whether the absolute value of variable rixjpunkt, which describes the time characteristic of variable rixj quantitatively describing the wheel properties, is less than a fourth threshold value S3d. The vehicle has a tendency to tip when the absolute value of the variable describing the time characteristic is less than fourth threshold value S3d.

In a fourth partial query, it is ascertained whether the absolute value of variable alphaix describing the angle of inclination of a wheel axle is greater than a fifth threshold value S3e. The vehicle has a tendency to tip when the absolute value of variable alphaix is greater than threshold value S3e.

With the aid of the partial queries taking place in step 306, the tendency of a vehicle to tip about a vehicle axis oriented in the longitudinal direction of the vehicle is detected when at least one of the four partial queries is satisfied. If at least one of the partial queries is satisfied in step 306, i.e., if the vehicle has a tendency to tip, then a step 307 is carried out following step 306. The output of variable KT taking place in block 206 when there is a tendency to tip is not shown in FIG. 3. However, if none of the partial queries is satisfied in step 306, i.e., the vehicle does not have a tendency to tip, then step 301 is carried out again following step 306.

As already indicated in conjunction with FIG. 2, suitable braking interventions and/or engine interventions and/or chassis interventions are implemented in step 307 to prevent the vehicle from tipping about a vehicle axis oriented in the longitudinal direction of the vehicle. It should be pointed out here that the interventions presented in step 307 are carried out starting from the vehicle controller in conjunction with the control logic when variables KT signal to the vehicle controller that the vehicle has a tendency to tip about a vehicle axis oriented in the longitudinal direction of the vehicle.

If it is found in step 303 that the absolute value of variable lambdaixj is greater than corresponding threshold value S2, then the first detection strategy cannot be used because faulty decisions would be made in step 306 because of the excessive slip values and the resulting error in determining variables rixj quantitatively describing the wheel properties. Therefore, if the absolute value of variable lambdaixj is greater than threshold value S2, following step 303, a step 308 is carried out initiating a second detection strategy. This second detection strategy is carried out as a function of the variable, determined for at least one wheel in a preceding time increment, quantitatively describing the wheel properties. A variable hsix describing the height of the vehicle center of gravity, in particular an axle-specific center of gravity height, is provided in step 308. To do this, variable hsix, for example, which was determined for a previous time increment when the query performed in step 303 was satisfied and which was stored temporarily, is input. As an alternative, variable hsix may be ascertained as a function of variables rixj, which were determined for a previous time increment when the query performed in step 303 was satisfied and which were stored temporarily. Axle-specific height hsix of the center of gravity is generally determined according to the equation:

$$hsix = \frac{C \cdot a^2}{mlix \cdot aq} \cdot alphaix$$

In this equation, variable C represents the resulting vertical rigidity of the wheels assigned to the wheel axle, variable a corresponds to half the tread of the wheel axle, variable alphaix corresponds to the angle of inclination of the wheel axle with respect to the roadway, variable mlix corresponds to the load acting on the wheel axle, and variable aq corresponds to the transverse acceleration acting on the vehicle. Used in this context are variables mlix, aq and alphaix from, for example, the time increment when the query taking place in step 303 was still satisfied. In this case, this means that variable mlix, variable aq and variable alphaix or variables rixj which are needed to determine variable alphaix must be saved in a buffer storage on an ongoing basis. A step 309 is carried out following step 308.

In step 309, a speed limiting value is determined in a conventional manner for cornering by the vehicle, on the basis of variable hsix describing the height of the vehicle center of gravity. The speed limiting value indicates the speed for the vehicle at which it cannot be expected to tip about a vehicle axis oriented in the longitudinal direction of the vehicle. With respect to determining the speed limiting value as a function of the variable describing the height of the vehicle center of gravity, reference is made, for example, to the formula given on page 346 of "*Kraftfahrtechnisches Taschenbuch*," VDI Verlag, 21$^{st}$ edition. A step 310 is carried out following step 309. In step 310, it is ascertained whether the amount of the difference between the vehicle speed and the speed limiting value is less than or equal to a threshold value S4. If the amount of the difference is less than or equal to threshold value S4, then the vehicle has a tendency to tip about a vehicle axis oriented in the longitudinal direction of the vehicle, and step 307 is carried out following step 310. However, if the amount of the difference is greater than threshold value S4, which is equivalent to the vehicle not having a tendency to tip, then step 301 is carried out following step 310.

The fact that only a one-piece vehicle is included in FIGS. 3*a* and 3*b* is not intended to restrict the present invention. The flow chart shown in FIGS. 3*a* and 3*b* can also be used in a corresponding manner for a vehicle combination.

At this point, it should be stressed again that, to be understood by the term detection strategy is the implementation, adapted to a traveling condition of the vehicle, of at least one plausibility query for detecting a tendency of a vehicle to tip about a vehicle axis oriented in the longitudinal direction of the vehicle. Illustratively, depending on the traveling condition, different plausibility queries can be performed, or different input variables can be used for the plausibility queries.

Figure 4:
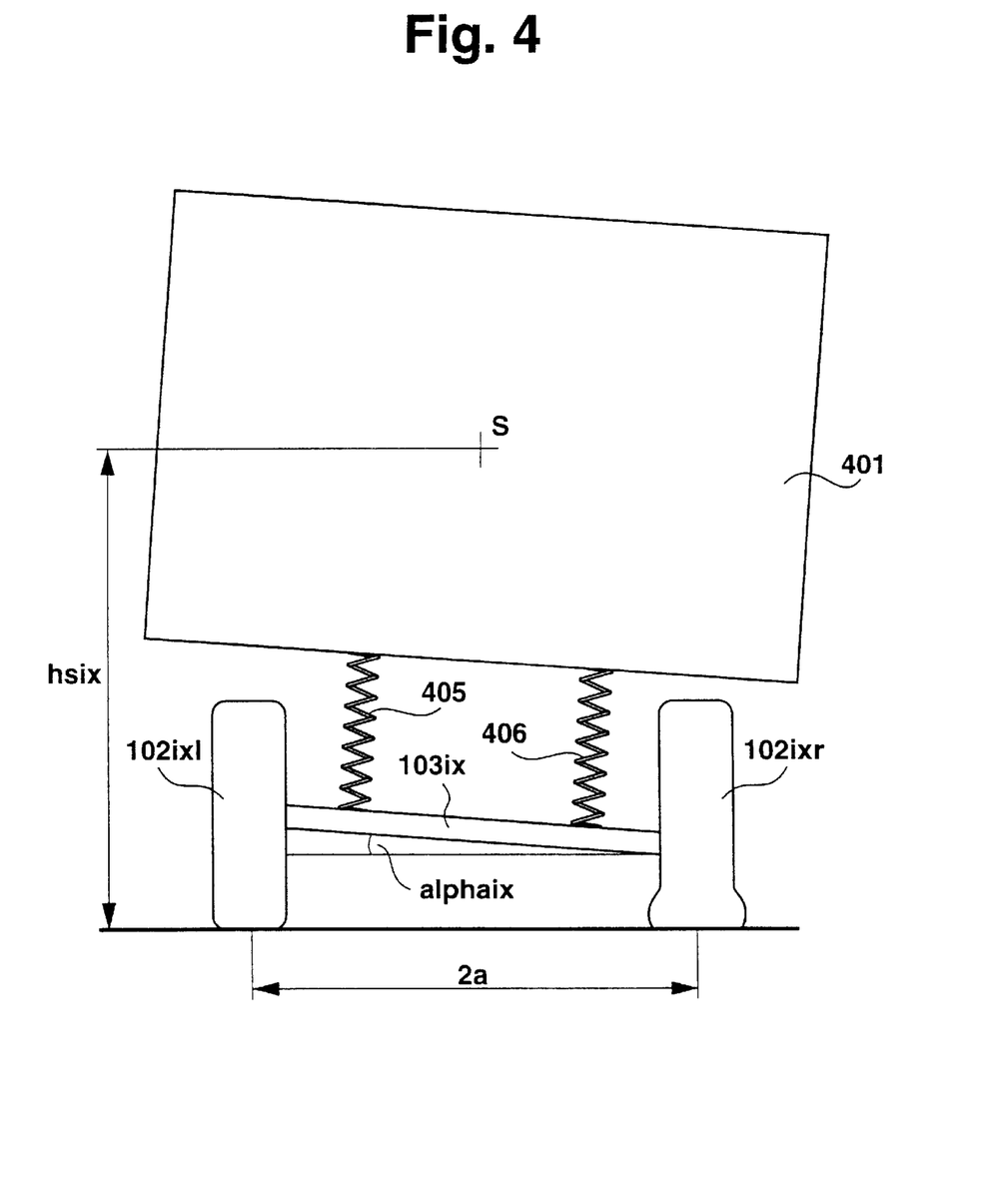
FIG. 4 shows a schematic illustrating physical conditions for a vehicle when cornering according to the present invention.

Finally, with the aid of FIG. 4, the factual physical situation on which the method according to the present invention is based shall be presented. FIG. 4 shows a schematic diagram of a one-piece vehicle, such as that illustrated in FIG. 1*a*. However, this is not intended to represent any restriction on the present invention.

FIG. 4 shows a wheel axle 103ix with associated wheels 102ixl and 102ixr. Also shown is vehicle body 401 which is attached to wheel axle 103ix by suspension devices 405 and 406, respectively. The tread 2*a* of the vehicle is indicated in FIG. 4. Axle-specific center of gravity S and the associated axle-specific height hsix of the center of gravity are also shown. Likewise shown is the angle of inclination alphaix of the wheel axle with respect to the road surface. The vehicle is turning left.

As FIG. 4 shows, load shifts occur when cornering, the load on wheel 102ixl on the inside of the curve is reduced, and in extreme situations it may lose contact with the ground. It does not matter here whether the cornering takes place on a flat or inclined roadway. Wheel 102ixr on the outside of the curve is under a greater load. Due to this load shift at the individual wheels, the respective dynamic rolling radius rixj changes. Consequently, these changes can be used to detect a wheel lifting up from the road surface, which in turn can be used to detect a tendency of the vehicle to tip about a vehicle axis oriented in the longitudinal direction of the vehicle.

In conclusion, it should be pointed out that the form of the exemplary embodiment selected for the description and the illustration selected in the Figures is not intended to represent any restriction with respect to the present invention.

What is claimed:

1. A method for detecting a tendency of a vehicle to tip about a vehicle axis oriented in a longitudinal direction of the vehicle, comprising the steps of:

ascertaining a variable for describing dynamics of a vehicle linear motion; and performing at least one of:

(A) selecting a detection strategy from at least two detection strategies, the at least two detection strategies being strategies for detecting the tendency of the vehicle to tip about the vehicle axis oriented in the longitudinal direction of the vehicle, the step of selecting being performed at least as a function of the variable for describing the dynamics of the vehicle linear motion; and (B) adapting a detection strategy to the dynamics of the vehicle linear motion existing at any particular time, the step of adapting being performed at least as a function of the variable for describing the dynamics of the vehicle linear motion, the adapted detection strategy being a strategy for detecting the tendency of the vehicle to tip about the vehicle axis oriented in the longitudinal direction of the vehicle.

2. The method according to claim 1, wherein the method is used for stabilizing the vehicle, and further comprising the step of:
responding to the tendency of the vehicle to tip about the vehicle axis oriented in the longitudinal direction of the vehicle by stabilizing the vehicle by applying at least one of brake interventions at at least one wheel, engine interventions, and interventions at chassis actuators.

3. The method according to claim 2, wherein stabilizing the vehicle includes preventing the vehicle from overturning.

4. The method according to claim 1, further comprising the step of:
ascertaining, for at least one wheel, a variable for describing a rotary motion of a representative wheel;
wherein at least one the following conditions is satisfied:
(C) the step of ascertaining the variable for describing the dynamics of the vehicle linear motion is performed at least as a function of the variable for describing the rotary motion of the representative wheel; and
(D) the adapted detection strategy is at least a function of the variable for describing the rotary motion of the representative wheel.

5. The method according to claim 4, wherein the variable for describing the dynamics of the vehicle linear motion corresponds to at least one of a drive slip and a brake slip ascertained for the at least one wheel and prevailing at the at least one wheel.

6. The method according to claim 4, wherein the variable for describing the rotary motion of the representative wheel is a variable for describing a speed of the representative wheel.

7. The method according to claim 1, further comprising the step of:
comparing an absolute value of the variable for describing the dynamics of the vehicle linear motion with at least one corresponding threshold value;
wherein at least one of the following conditions is satisfied:
(C) the step of selecting the detection strategy is performed at least as a function of the comparing of the absolute value of the variable for describing the dynamics of the vehicle linear motion with the at least one corresponding threshold value; and
(D) the adapted detection strategy is at least a function of the comparing of the absolute value of the variable for describing the dynamics of the vehicle linear motion with the at least one corresponding threshold value.

8. The method according to claim 1, further comprising the step of:
ascertaining, for at least one wheel, a variable for describing wheel properties, and
wherein at least one of the at least two detection strategies is carried out at least as a function of the variable for describing the wheel properties.

9. The method according to claim 8, wherein the variable for describing the wheel properties for the at least one wheel is at least one of a diameter and a radius of a respective wheel.

10. The method according to claim 8, wherein the step of ascertaining the variable for describing wheel properties is performed at least as a function of at least one of a variable for describing a speed of a representative wheel, a variable for describing a vehicle speed, a variable for describing dynamics of a vehicle lateral motion and a variable for describing a vehicle geometry.

11. The method according to claim 8, further comprising the step of:
comparing an absolute value of the variable for describing the dynamics of the vehicle linear motion with at least one corresponding threshold value;
wherein at least one of the following conditions is satisfied:
(C) a first detection strategy of the at least two detection strategies is carried out when the absolute value of the variable for describing the dynamics of the vehicle linear motion is less than at least one corresponding threshold value, the first detection strategy being carried out at least as a function of the variable for describing the wheel properties, the variable for describing the wheel properties being ascertained for the at least one wheel in a prevailing time increment; and
(D) a second detection strategy of the at least two detection strategies is carried out when the absolute value of the variable for describing the dynamics of the vehicle linear motion is greater than the at least one corresponding threshold value, the second detection strategy being carried out at least as a function of the variable for describing the wheel properties, the variable for describing the wheel properties being ascertained for the at least one wheel in a previous time increment.

12. The method according to claim 8, at least one of the following:
(1) wherein in a first detection strategy of the at least two detection strategies, the vehicle has the tendency to tip about the vehicle axis oriented in the longitudinal direction of the vehicle when at least one of (C) a value of the variable for describing the wheel properties is greater than a first threshold value, (D) a value of the variable for describing the wheel properties is less than a second threshold value, (E) a difference between a value of the variable for describing the wheel properties and a comparison value is greater than a corresponding threshold value, (F) an absolute value of a variable for describing a time characteristic of the variable for describing the wheel properties is less than a corresponding threshold value, and (G) an absolute value of a variable for describing an angle of inclination of a wheel axle is greater than a corresponding threshold value, the variable for describing the wheel properties being determined for each wheel of a corresponding wheel axle, the variable for describing the angle of inclination of the corresponding wheel axle being determined as a function of the variables for describing the wheel properties for each wheel of the corresponding wheel axle, and
(2) wherein in a second detection strategy of the at least two detection strategies, the vehicle has the tendency to tip about the vehicle axis oriented in the longitudinal direction of the vehicle when an absolute value of a difference between a variable for describing a vehicle speed and a speed limiting value is less than a corresponding threshold value.

13. The method according to claim 12, wherein the speed limiting value is ascertained at least as a function of a variable for describing a height of a vehicle center of gravity, the variable for describing the height of the vehicle center of gravity being ascertained at least as a function of the variable for describing the wheel properties for the at least one wheel.

14. The method according to claim 1, further comprising the step of:

ascertaining a variable for describing dynamics of a vehicle lateral motion, and wherein detecting the tendency of the vehicle to tip about the vehicle axis oriented in the longitudinal direction of the vehicle is carried out when an absolute value of the variable for describing the dynamics of the vehicle lateral motion is greater than a corresponding threshold.

15. The method according to claim 14, wherein the variable for describing the dynamics of the vehicle lateral motion includes at least one of a variable for describing a transverse acceleration and a variable for describing a yaw rate of the vehicle.

16. The method according to claim 1, wherein adapting the detection strategy to the dynamics of the vehicle linear motion existing at any particular time includes at least one of:

selecting at least one input variable of a plurality of input variables for carrying out the adapted detection strategy, the step of selecting the at least one input variable being at least a function of existing dynamics of the vehicle linear motion; and implementing plausibility queries, the plausibility queries being altered at least as the function of the existing dynamics of the vehicle linear motion.

17. The method according to claim 16, wherein the plurality of input variables includes variables for describing wheel properties.

18. A device for detecting a tendency of a vehicle to tip about a vehicle axis oriented in a longitudinal direction of the vehicle, comprising:

means for ascertaining a variable for describing dynamics of a vehicle linear motion; and at least one of (A) means for selecting a detection strategy from at least two detection strategies, the at least two detection strategies being strategies for detecting the tendency of the vehicle to tip about the vehicle axis oriented in the longitudinal direction of the vehicle, the selecting being at least a function of the variable for describing the dynamics of the vehicle linear motion and (B) means for adapting a detection strategy to the dynamics of the vehicle linear motion existing at any particular time, the adapting being at least a function of the variable for describing the dynamics of the vehicle linear motion, the adapted detection strategy being a strategy for detecting the tendency of the vehicle to tip about the vehicle axis oriented in the longitudinal direction of the vehicle.

19. The device according to claim 18, wherein the device is used in a device for stabilizing the vehicle and wherein, in response to the tendency of the vehicle to tip about the vehicle axis oriented in the longitudinal direction of the vehicle, at least one of brake interventions at at least one wheel, engine interventions, and interventions at chassis actuators are implemented.

20. The device according to claim 19, wherein the device for stabilizing the vehicle includes a device for preventing the vehicle from overturning.

21. The method according to claim 12, wherein the variable for describing the wheel properties describes wheel performance.

* * * * *